US012786098B2

(12) United States Patent
Singh et al.

(10) Patent No.: US 12,786,098 B2
(45) Date of Patent: Nov. 3, 2026

(54) METHODS FOR ONBOARDING NETWORK DEVICES IN DISAGGREGATED SCHEDULED FABRICS AND SYSTEMS THEREOF

(71) Applicant: Cisco Technology, Inc., San Jose, CA (US)

(72) Inventors: Tapraj Singh, San Ramon, CA (US); Sunesh Rustagi, San Jose, CA (US); Vijay Krishnaji Tapaskar, Palo Alto, CA (US); Praveen Bhagwatula, Cary, NC (US); Prashanth Buddhala, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 58 days.

(21) Appl. No.: 18/771,981

(22) Filed: Jul. 12, 2024

(65) Prior Publication Data

US 2025/0274379 A1 Aug. 28, 2025

Related U.S. Application Data

(60) Provisional application No. 63/558,565, filed on Feb. 27, 2024.

(51) Int. Cl.
*H04L 45/02* (2022.01)
*H04L 45/00* (2022.01)
*H04L 45/586* (2022.01)

(52) U.S. Cl.
CPC .............. *H04L 45/04* (2013.01); *H04L 45/46* (2013.01); *H04L 45/586* (2013.01)

(58) Field of Classification Search
CPC ....... H04L 45/04; H04L 45/46; H04L 45/586; H04L 45/50; H04L 45/02
See application file for complete search history.

(56) References Cited

U.S. PATENT DOCUMENTS 7,480,258 B1 * 1/2009 Shuen ...................... H04L 45/48 370/256
9,497,140 B2 * 11/2016 Palazzolo ........... H04L 41/0806
(Continued)

FOREIGN PATENT DOCUMENTS

CN 109412949 A 3/2019
WO 2015024388 A1 2/2015

OTHER PUBLICATIONS

European Search Report for European Application No. 25155429.1, dated Jun. 18, 2025, 13 Pages.

(Continued)

*Primary Examiner* — El Hadji M Sall
(74) *Attorney, Agent, or Firm* — Rutan & Tucker, LLP; Ravi Mohan; Marc A. McClain

(57) ABSTRACT

Devices, networks, systems, methods, and processes for onboarding a network device in a cluster in a Disaggregated Scheduled Fabric (DSF) are described herein. To associate with the cluster, the network device can determine a cluster size. The network device may determine a switch identifier based on the cluster size. The network device can reserve a set of system ports for in-band communication. The network device may assign at least one in-band communication interface to the set of system ports. The network device may instantiate a Virtual Routing and Forwarding (VRF) instance for the at least one in-band communication interface. The network device can generate a custom Media Access Control (MAC) address and a custom Internet Protocol (IP) address based on the switch identifier. The network device may establish one or more in-band communication sessions with other network devices in the cluster based on the at least one in-band communication interface.

17 Claims, 7 Drawing Sheets

(56) References Cited

U.S. PATENT DOCUMENTS

| | | | |
|---|---|---|---|
| 10,333,836 B2 | 6/2019 | Manthiramoorthy et al. | |
| 11,025,536 B1 | 6/2021 | Venkataramanan et al. | |
| 11,356,319 B2 | 6/2022 | Devaraj et al. | |
| 11,575,541 B1 | 2/2023 | Styszynski | |
| 2003/0039007 A1* | 2/2003 | Ramadas | H04L 45/54 398/48 |
| 2015/0304117 A1 | 10/2015 | Dong et al. | |
| 2015/0334011 A1 | 11/2015 | Zheng et al. | |
| 2016/0127236 A1* | 5/2016 | Zahid | H04L 45/58 709/219 |
| 2017/0093703 A1 | 3/2017 | Natu et al. | |
| 2017/0195220 A1 | 7/2017 | Sivaraj et al. | |
| 2017/0353433 A1 | 12/2017 | Antony et al. | |
| 2018/0041360 A1 | 2/2018 | Shen et al. | |
| 2018/0077047 A1 | 3/2018 | Srinivasan et al. | |
| 2018/0124171 A1 | 5/2018 | Han et al. | |
| 2021/0067433 A1 | 3/2021 | Kommula et al. | |
| 2021/0075759 A1 | 3/2021 | Mandal et al. | |
| 2021/0211323 A1 | 7/2021 | Patel et al. | |
| 2021/0336867 A1 | 10/2021 | Patwardhan et al. | |
| 2023/0093310 A1 | 3/2023 | Ye et al. | |
| 2023/0412485 A1 | 12/2023 | Sommers et al. | |
| 2024/0323121 A1 | 9/2024 | Shu et al. | |
| 2025/0158913 A1 | 5/2025 | Dikshit et al. | |

OTHER PUBLICATIONS

Vega A., et al., "ACI Troubleshooting Book Documentation Contents", Cisco.com, Feb. 15, 2016, XP055503219, 230 Pages, Retrieved from https://media.readthedocs.org/pdf/aci-troubleshooting-book/latest/aci-troubleshooting-book.pdf on Aug. 29, 2018, pp. 56, 93-96.

European Search Report for European Application No. 25155096.8, dated Jun. 12, 2025, 13 Pages.

* cited by examiner

METHODS FOR ONBOARDING NETWORK DEVICES IN DISAGGREGATED SCHEDULED FABRICS AND SYSTEMS THEREOF

The present disclosure relates to communication networks. More particularly, the present disclosure relates to a leaf-spine fabric topology in a network.

This application claims the benefit of U.S. Provisional Patent Application No. 63/558,565, filed Feb. 27, 2024, which is incorporated by reference herein in its entirety.

BACKGROUND

Networks include a large number of network devices such as spine switches, leaf switches, routers, gateways etc. The spine and leaf switches may be interconnected in a leaf-spine topology to provide multiple routes for forwarding or routing data traffic in the network between endpoints. The spine switches may interconnect the leaf switches to form a backbone of the network. The leaf switches can function as an access layer that connects to host devices. The leaf switches may serve as entry and exit points for traffic originating from or destined to the host devices. When the host devices are connected to different leaf switches, a path between the host devices may include multiple hops. The leaf-spine fabric can provide a scalable and efficient architecture for routing large data flows and traffic within a data center network.

In a Disaggregated Scheduled Fabric (DSF), connectivity is required between the leaf switches in the DSF to ensure efficient routing or forwarding of the large data flows. This necessitates utilization of in-band connectivity between the leaf switches in the DSF. The need for in-band connectivity also arises from challenges associated with configuring and managing the leaf-spine fabric in the DSF. In one of the challenges faced in establishing in-band connectivity, care and manual intervention is required to generate and apply configurations for in-band communication interfaces, thereby limiting scalability of the DSF. Moreover, configuring the in-band interfaces and initialization of protocols such as Border Gateway Protocol (BGP) or internal BGP (iBGP) is complex. Hence, relying on manual configuration techniques is prone to errors. These errors can potentially affect network operations, thereby hindering performance of the network.

Some conventional networks include a centralized orchestrator to configure and initialize the network devices in the DSF. However, in large-scale clusters of devices, more errors are prone to be introduced in the configuration of the network devices. Furthermore, debugging a network device or a fabric link in the cluster to determine the errors introduced during initialization or deployment is especially difficult in the large-scale clusters.

SUMMARY OF THE DISCLOSURE

Systems and methods for onboarding a network device in a Disaggregated Scheduled Fabric (DSF) in accordance with embodiments of the disclosure are described herein. In some embodiments, a device includes a processor, and a memory communicatively coupled to the processor, wherein the memory includes a device onboarding logic that is configured to detect a set of network devices in a cluster, determine a cluster size associated with the cluster, generate a switch identifier based on the cluster size, select one or more system ports based at least on the switch identifier and the cluster size, and assign at least one in-band communication interface to the one or more system ports.

In some embodiments, device onboarding logic is configured to instantiate at least one Virtual Routing and Forwarding (VRF) instance for the at least one in-band communication interface.

In some embodiments, the device onboarding logic is further configured to generate, based on the switch identifier, at least one of a custom Media Access Control (MAC) address or a custom Internet Protocol (IP) address.

In some embodiments, the device onboarding logic is further configured to determine one or more routes associated with at least one network device of the set of network devices.

In some embodiments, the device onboarding logic is further configured to generate, for the at least one VRF instance, a routing table including the one or more routes.

In some embodiments, the device onboarding logic is further configured to detect at least one remote host device, determine one or more next hop interfaces associated with the at least one remote host device, and store the one or more next hop interfaces in the routing table.

In some embodiments, the device onboarding logic is further configured to establish, through the at least one in-band communication interface, one or more in-band communication sessions with the set of network devices.

In some embodiments, the one or more in-band communication sessions are established based on internal Border Gateway Protocol (iBGP).

In some embodiments, the device onboarding logic is further configured to generate a first iBGP update message indicative of one or more of the custom MAC address or the custom IP address, and transmit the first iBGP update message to the set of network devices.

In some embodiments, the device onboarding logic is further configured to receive a second iBGP update message indicative of one or more updated routes, and update the routing table based on the one or more updated routes.

In some embodiments, the device onboarding logic is further configured to create one or more Virtual Output Queues (VOQs) for the at least one in-band communication interface.

In some embodiments, the device onboarding logic is further configured to determine one or more physical parameters of the set of network devices, and determine the cluster size based on the one or more physical parameters.

In some embodiments, the cluster size is indicative of a maximum count of the set of network devices in the cluster.

In some embodiments, a method includes creating a cluster including a set of network devices, determining a cluster size associated with the cluster, detecting a network device, assigning a switch identifier to the network device based on the cluster size, adding the network device to the cluster, selecting, based at least on the switch identifier and the cluster size, one or more system ports of the network device, and configuring at least one in-band communication interface for the one or more system ports.

In some embodiments, the method further includes instantiating at least one Virtual Routing and Forwarding (VRF) instance for the at least one in-band communication interface.

In some embodiments, the method further includes assigning to the network device, based on the switch identifier, at least one of a custom Media Access Control (MAC) address or a custom Internet Protocol (IP) address.

In some embodiments, the method further includes establishing one or more in-band communication sessions between the network device and the set of network devices through the at least one in-band communication interface based at least on the custom MAC address or the custom IP address.

In some embodiments, a device onboarding logic is configured to determine a switch identifier, select one or more in-band system ports based on the switch identifier, assign at least one in-band communication interface to the one or more in-band system ports, and instantiate at least one Virtual Routing and Forwarding (VRF) instance for the at least one in-band communication interface.

In some embodiments, the device onboarding logic is further configured to generate, based on the switch identifier, one or more of a custom Media Access Control (MAC) address or a custom Internet Protocol (IP) address.

In some embodiments, the device onboarding logic is further configured to establish an in-band communication session through the at least one in-band communication interface based at least on the custom MAC address or the custom IP address.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
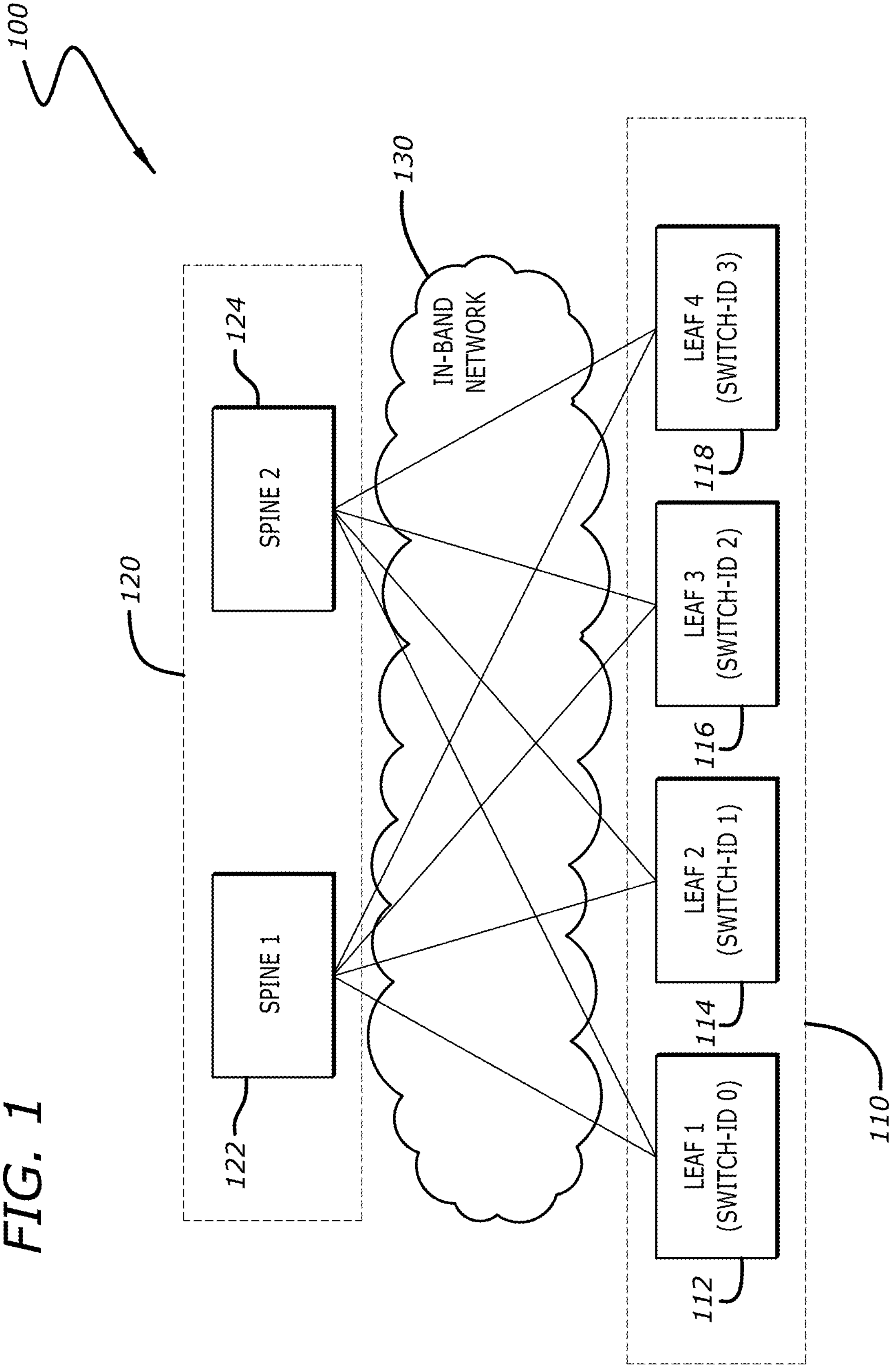
FIG. 1 is a conceptual illustration of a network illustrating a cluster in a leaf-spine fabric, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that provide onboarding a network device in a Disaggregated Scheduled Fabric (DSF). In many embodiments, the DSF may include numerous network devices such as but not limited to spine switches or leaf switches, for example. A plurality of spine and leaf switches can be connected in a leaf-spine topology, i.e., a leaf-spine fabric. The leaf switches may include Top-Of-Rack (TOR) switches or End of Row (EOR) switches etc., for example. Multiple TOR switches and one or more spine switches can be connected in a mesh topology. The TOR switches may be deployed at an edge of a network, near servers, storage arrays, and other network devices such as but not limited to application servers or virtual machines etc. for example. The TOR switches can be connected to the host devices directly or indirectly. The TOR switches may also facilitate Virtual Local Area Network (VLAN) tagging, routing protocols, access control lists, or Quality of Service (QoS) etc., for example.

In a number of embodiments, the DSF may include a cluster of leaf switches and spine switches. In some embodiments, for example, a number of leaf switches in the cluster may be more than a number of spine switches in the cluster. In certain embodiments, for example, each leaf switch in the cluster can be connected to other leaf switches in the cluster by way of one or more spine switches. Each switch, such as the leaf switch or the spine switch, in the DSF can possess different hardware capabilities. In more embodiments, for example, the switches may possess different physical parameters, such as but not limited to, a maximum number of nodes that can be supported by the switches, number of ports in the switches, memory or processing capabilities of the switches, protocols implemented by the switches, bandwidth of links connected to the switches, etc. In some embodiments, for example, a cluster size may be indicative of a count of the switches in the cluster. In certain embodiments, for example, the cluster size can be indicative of a maximum number of switches in the cluster. In some more embodiments, the cluster size can be dependent on the hardware capabilities or the physical parameters of the switches in the cluster. The switches in the cluster can be configured with one or more Virtual Routing and Forwarding (VRF) functions. The VRF may facilitate the switches to utilize multiple routing and/or forwarding tables to route or forward data traffic on different fabric links in the DSF. The fabric links can include one or more network paths within the cluster that can be utilized to forward the data traffic. The data traffic may originate from a first host device connected to a first leaf switch in the cluster and may be destined for a second host device connected to a second leaf switch in the cluster. In some more embodiments, in that case, the data traffic may be forwarded from the first leaf switch to the second leaf switch by way of one or more fabric links.

In various embodiments, the cluster can be scaled by adding more leaf switches or spine switches to the cluster. While adding a leaf switch to the cluster, the leaf switch can be classified as a DSF switch based on the hardware capabilities of the leaf switch. The onboarding of the leaf switch in the cluster may be performed by a device onboarding logic. In some embodiments, for example, the device onboarding logic can be implemented in the leaf switch. In certain embodiments, for example, the device onboarding logic can be implemented by a controller such as but not limited to Cisco Application Policy Infrastructure Controller (APIC). In more embodiments, the cluster may be in communication with a cloud controller to onboard the leaf switch into the cluster. For onboarding the leaf switch, a switch identifier may be assigned to the leaf switch. The switch identifier can facilitate uniquely identifying the leaf switch in the cluster. The switch identifier may be assigned based on the cluster size associated with the cluster. In some more embodiments, for example, if the switches can support maximum 256 nodes, the switch identifiers in the cluster may vary from 0-255. In many more embodiments, for example, the switch identifier can be assigned based on hardware serial numbers, Media Access Control (MAC) addresses, or user-defined labels etc. In still more embodiments, the switch identifiers for the switches in the cluster can be assigned statically at the time of initialization of the switches or dynamically during run time. In many further embodiments, the switch identifiers can be assigned based on a combination of the MAC addresses, the hardware serial numbers, or the user-defined labels etc.

In additional embodiments, the leaf switch may include multiple system ports. The system ports can include network facing ports connected to the host devices and fabric facing ports connected to the spine switches. The leaf switch may select one or more system ports based on the switch identifier. In some embodiments, for example, for a cluster including four leaf switches and two spine switches, the switch identifiers for the leaf switches may include Switch-ID-0 through Switch-ID-3, and each leaf switch may include at least two system ports associated with the two spine switches. The leaf switch can assign at least one in-band communication interface to the one or more selected system ports. In more embodiments, for example, the at least one in-band communication interface may be connected to one or more spine switches in the cluster. In some more embodiments, for example, the at least one in-band communication interface can facilitate in-band communication sessions with other leaf switches in the cluster. In numerous embodiments, for example, by way of the in-band communication sessions, the network can implement policies, routing, and/or traffic management for the data traffic within the cluster. In many more embodiments, the leaf switch may reserve the one or more selected system ports as in-band system ports for in-band communication. In many more embodiments, the leaf switch can implement a loop that can iterate over each system port of the leaf switch to select the system port and assign the selected system port as the in-band system port, thereby ensuring that at least one in-band system port is assigned to the in-band communication interface.

In further embodiments, the leaf switch can instantiate at least one VRF instance for the at least one in-band communication interface. In many more embodiments, for example, the leaf switch may associate the system ports with the VRF instance (DSF_VRF, i.e., the VRF instance associated with the cluster in the DSF). Every leaf switch in the cluster may be associated with the VRF instance (DSF_VRF) to form an in-band DSF network. The data traffic originating from or destined to one or more of the switches in the cluster may be routed through VRF, i.e., DSF_VRF. The leaf switch may be configured to enable Virtual Output Queues (VOQ) for the data traffic associated with the cluster or the in-band DSF network. In that, the leaf switch may comprise one or more VOQs for the at least one in-band communication interface. The leaf switch may include a credit scheduler to grant credits associated with the one or more VOQs.

In many more embodiments, the leaf switch may generate at least one custom MAC address and/or at least one custom Internet Protocol (IP) address. The custom MAC address and/or the custom IP address can be utilized to uniquely identify the leaf node within the cluster. In that, the data traffic within the cluster designated to the at least one in-band communication interface of the leaf node can be addressed by the custom MAC address and/or the custom IP address. In some embodiments, for example, the custom MAC address and the custom IP address may include the switch identifier associated with the leaf switch. In some embodiments, the generation and assignment of the custom MAC address and/or the custom IP address may be automated. In more embodiments, the custom MAC address and/or the custom IP address can be generated and assigned during initialization of the leaf switch.

In many additional embodiments, the leaf switch can generate and store a static neighbor table. In some embodiments, the static neighbor table can include one or more MAC addresses and IP addresses associated with the network devices in the cluster. In certain embodiments, the static neighbor table may also store one or more next hop interfaces associated with the network devices in the cluster. The next hop interfaces can be indicative of physical ports or links through which the data traffic should be forwarded to reach a destination switch or destination host device. The data traffic can include a destination MAC address and/or a destination IP address associated with the destination switch or the destination host device. In more embodiments, the static neighbor table can store mapping between MAC addresses and IP addresses of neighboring or adjacent switches in the cluster. In some more embodiments, the leaf switch can route or forward the data traffic in the cluster based on the static neighbor table. In numerous embodiments, the static neighbor table can store one or more of switch identifiers, system port identifiers, MAC addresses, IP addresses, next hop interfaces, or routes, etc. associated with the network devices in the cluster. In many more embodiments, the leaf switch can implement a loop that iterates over each switch identifier in the cluster to populate the static neighbor table with the MAC addresses and/or IP addresses associated with the switch identifier, thereby ensuring that entries for all the network devices in the cluster are populated in the static neighbor table.

In many further embodiments, the leaf switch can detect one or more host devices that can be located outside the cluster but can be reachable through one or more network devices within the cluster. The leaf switch may determine one or more default gateways associated with the host devices. The leaf switch can determine the next hop interfaces associated with the host devices. The leaf switch may update the routing and/or forwarding tables to store the MAC addresses or the IP addresses associated with the host devices. The leaf switch may utilize one or more protocols such as but not limited to Address Resolution Protocol for determining the MAC addresses of the host devices. In some embodiments, the leaf switch can monitor a topology of the cluster and update the routing and/or forwarding tables based on one or more dynamic changes in the topology of the cluster. In that, in certain embodiments, the leaf switch can update the routing and/or forwarding tables when one or more network devices are added to the cluster, when one or more fabric links in the cluster change operational status, or when one or more changes in network conditions are detected etc. for example.

In still many embodiments, the leaf switch may establish one or more in-band communication sessions with the network devices in the cluster through the at least one in-band communication interface. The in-band communication sessions can be established based on internal Border Gateway Protocol (iBGP). The leaf switch can advertise or exchange the custom MAC address, custom IP address, routes, or next hop interfaces etc. through one or more iBGP update messages. In some embodiments, the leaf switch can generate a first iBGP update message indicative of the custom MAC address and/or the custom IP address. The leaf switch may transmit the first iBGP update message to the network devices in the cluster. The leaf switch may receive a second iBGP update from one or more network devices in the cluster. The second iBGP update message can be indicative of one or more of: the MAC addresses or IP addresses associated with the network devices in the cluster, the next hop interfaces associated with the host devices, or updated routing data etc. The leaf switch may update the routing and/or forwarding tables based on the second iBGP update message.

Advantageously, the network of the present disclosure can automate the onboarding of the leaf switch into the cluster in the DSF. The automation of the onboarding of the network devices in the DSF can eliminate or reduce errors associated with manual configuration of the network devices. Therefore, the leaf switches can be deployed into the DSF without requiring manual intervention, thereby enhancing reliability and performance of the network. The automatic onboarding of the network devices also improves scalability of the network.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a network 100 illustrating a cluster in a leaf-spine fabric, in accordance with various embodiments of the disclosure is shown. In many embodiments, the network 100 may comprise a plurality of leaf switches 110 and a plurality of spine switches 120 forming the cluster. The plurality of leaf switches 110 and the plurality of spine switches 120 may be connected by an in-band network 130. The plurality of leaf switches 110 may include a set of leaf switches comprising first through fourth leaf switches 112-118. The plurality of spine switches 120 may include a set of spine switches comprising a first spine switch 122 and a second spine switch 124. The leaf-spine fabric can be a Disaggregated Scheduled Fabric (DSF).

In a number of embodiments, the plurality of leaf switches 110 can be configured with one or more Virtual Routing and Forwarding (VRF) functions. The VRF may facilitate the plurality of leaf switches 110 to utilize multiple routing and/or forwarding tables to route data traffic within the in-band network 130. The in-band network 130 may include multiple fabric links or network paths between the plurality of leaf switches 110 and the plurality of spine switches 120. Each leaf switch of the plurality of leaf switches 110 can comprise a plurality of system ports reserved as in-band system ports. In some embodiments, for example, each leaf switch of the plurality of leaf switches 110 may include at least two in-band system ports associated with the first spine switch 122 and the second spine switch 124.

In various embodiments, each leaf switch of the plurality of leaf switches 110 may be configured with a unique switch identifier. Each leaf switch of the plurality of leaf switches 110 can be associated with a custom Media Access Control (MAC) address and a custom Internet Protocol (IP) address. In some embodiments, the custom MAC address and the custom IP address may be generated based on the corresponding switch identifier. In certain embodiments, the custom MAC address and the custom IP address may include the corresponding switch identifier. In more embodiments, each leaf switch of the plurality of leaf switches 110 can generate the custom MAC address and the custom IP address at the time of initialization or associating with the cluster. In some more embodiments, data traffic within the within the in-band network 130 may be forwarded or routed based on the custom MAC addresses and/or the custom IP addresses associated with the plurality of leaf switches 110.

In additional embodiments, the plurality of leaf switches 110 can generate and store a static neighbor table. The plurality of leaf switches 110 may establish in-band communication sessions such as internal Border Gateway Protocol (iBGP) sessions to advertise the custom MAC address and the custom IP address. The plurality of leaf switches 110 can advertise the custom MAC address and the custom IP address by transmitting an iBGP update message indicative of the custom MAC address and the custom IP address. The plurality of leaf switches 110 may utilize one or more address families such as but not limited to IP version 4 (IPv4) address family, IP version 6 (IPv6) address family, or Ethernet Virtual Private Network (EVPN) address family etc. to advertise the custom MAC address and the custom IP address. In some embodiments, the plurality of leaf switches 110 can transmit EVPN Route Type 2 messages to advertise the custom MAC address and the custom IP address. Each leaf switch of the plurality of leaf switches 110 may also receive one or more iBGP update messages indicative of the MAC addresses and IP addresses associated with other leaf switches in the cluster. The plurality of leaf switches 110 can update the routing and/or forwarding tables to store the MAC addresses and IP addresses associated with the other leaf switches in the cluster.

Although a specific embodiment for the network 100 for carrying out the various steps, processes, methods, and operations described herein is discussed with respect to FIG. 1, any of a variety of systems and/or processes may be utilized in accordance with embodiments of the disclosure. For example, the network 100 may be scaled to add more leaf switches to the cluster. The elements depicted in FIG. 1 may also be interchangeable with other elements of FIGS. 2-7 as required to realize a particularly desired embodiment.

Figure 2:
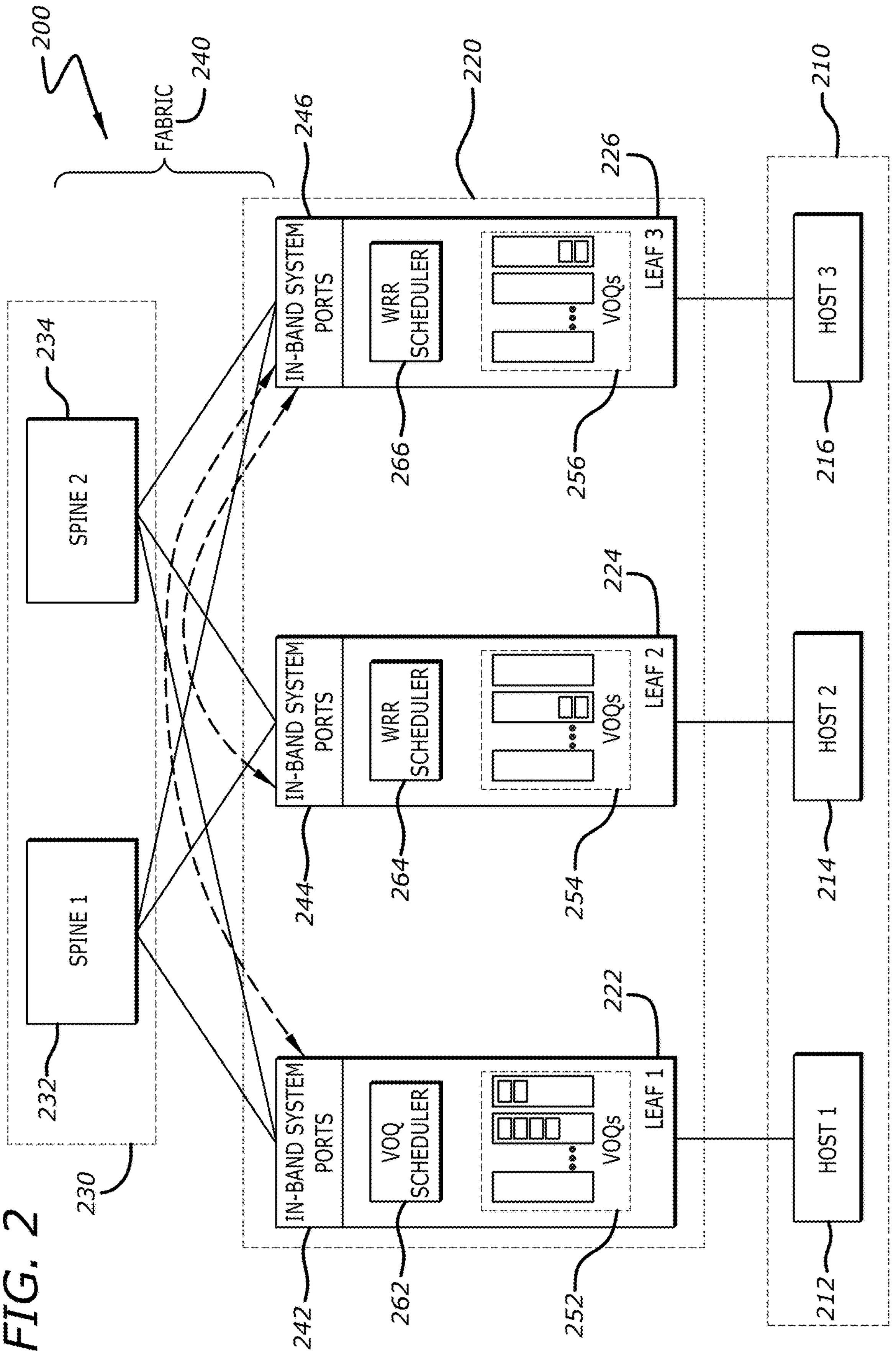
FIG. 2 is a conceptual illustration of a network illustrating a cluster in a leaf-spine fabric, in accordance with various embodiments of the disclosure.

Referring to FIG. 2, a conceptual illustration of a network 200 illustrating a cluster in a leaf-spine fabric 240, in accordance with various embodiments of the disclosure is shown. In many embodiments, the network 200 may comprise a plurality of host devices 210, a plurality of leaf switches 220, and a plurality of spine switches 230. The plurality of host devices 210 can include a first host device 212, a second host device 214, and a third host device 216. The plurality of leaf switches 220 and the plurality of spine switches 230 may be connected by one or more in-band communication interfaces. The plurality of leaf switches 220 may include a set of leaf switches comprising a first leaf switch 222, a second leaf switch 224, and a third leaf switch 226. The plurality of spine switches 230 may include a set of spine switches comprising a first spine switch 232 and a second spine switch 234. The leaf-spine fabric 240 can be the DSF. The first host device 212 may be connected to the first leaf switch 222, the second host device 214 can be connected to the second leaf switch 224, and the third host device 216 may be connected to the third leaf switch 226.

In a number of embodiments, the plurality of leaf switches 220 can be configured to enable Virtual Output Queues (VOQ) for the data traffic associated with the cluster. The first leaf switch 222 may include a first set of system ports 242, a first set of VOQs 252, and a first scheduler 262. The second leaf switch 224 can include a second set of system ports 244, a second set of VOQs 254, and a second scheduler 264. The third leaf switch 226 may include a third set of system ports 246, a third set of VOQs 256, and a third scheduler 266. In some embodiments, the first through third schedulers 262, 264 and 266 may be VOQ schedulers and/or Weighted Round Robin (WRR) schedulers. The WRR schedulers may assign weights to each VOQ and may cycle through the VOQs to transmit data stored in the VOQs based on the corresponding weights of the VOQs. The VOQ schedulers may include credit schedulers to grant credits associated with the VOQs.

In various embodiments, the first leaf switch 222 can determine a first switch identifier associated with the first leaf switch 222. The first set of system ports 242 can be fabric-facing system ports. The first leaf switch 222 can select the first set of system ports 242 from a plurality of system ports of the first leaf switch 222 based on the first switch identifier. In some embodiments, the first leaf switch 222 can implement a loop that can iterate over each system port of the first leaf switch 222 to select the system port and configure the selected system port as an in-band system port. The first leaf switch 222 can iterate the loop by incrementing the switch identifier for each system port until the switch identifier reaches a cluster size associated with the cluster. In some embodiments, for example, the cluster size may be indicative of a number of the plurality of leaf switches 220. In certain embodiments, for example, the cluster size can be indicative of a maximum number of leaf switches in the plurality of leaf switches 220. In some more embodiments, the cluster size can be dependent on the hardware capabilities or the physical parameters of the plurality of leaf switches 220. The first leaf switch 222 can reserve the first set of system ports 242 as in-band system ports for in-band communication within the cluster. The first leaf switch 222 may assign at least one in-band communication interface to the first set of system ports 242. The first leaf switch 222 may instantiate at least one VRF instance for the at least one in-band communication interface. In more embodiments, for example, the first leaf switch 222 may associate the first set of system ports 242 with the VRF instance (DSF_VRF, i.e., the VRF instance associated with the cluster in the DSF). The first leaf switch 222 may generate a first custom MAC address and a first custom IP address based on the first switch identifier. Similarly, the second leaf switch 224 and the third leaf switch 226 may be associated with a second switch identifier and a third switch identifier respectively. The second leaf switch 224 and the third leaf switch 226 may assign the second set of system ports 244 and the third set of system ports 246 with the at least one in-band communication interface. The second leaf switch 224 and the third leaf switch 226 can also associate the second set of system ports 244 and the third set of system ports 246 with the VRF instance (DSF_VRF). The second leaf switch 224 and the third leaf switch 226 may generate second custom MAC and IP addresses and third custom MAC and IP addresses based on the second switch identifier and the third switch identifier respectively.

In additional embodiments, when the third leaf switch 226 is added to the cluster, the third leaf switch 226 may establish in-band communication sessions with the first leaf switch 222 and the second leaf switch 224. The communication sessions can be iBGP sessions. The third leaf switch 226 may advertise the third custom MAC address and the third custom IP address to the first leaf switch 222 and the second leaf switch 224 by generating and transmitting a first iBGP update message. The third leaf switch can receive a second iBGP update message from the first leaf switch 222 and/or the second leaf switch 224. The second iBGP update message may be indicative of the second and/or third custom MAC and IP addresses. The third leaf switch 226 can update the routing and/or forwarding tables to store the second and/or third custom MAC and IP addresses.

Although a specific embodiment for the network 200 for carrying out the various steps, processes, methods, and operations described herein is discussed with respect to FIG. 2, any of a variety of systems and/or processes may be utilized in accordance with embodiments of the disclosure. For example, the third leaf switch 226 may be onboarded into the cluster without requiring additional configuration or manual intervention. The elements depicted in FIG. 2 may also be interchangeable with other elements of FIG. 1 and FIGS. 3-7 as required to realize a particularly desired embodiment.

Figure 3:
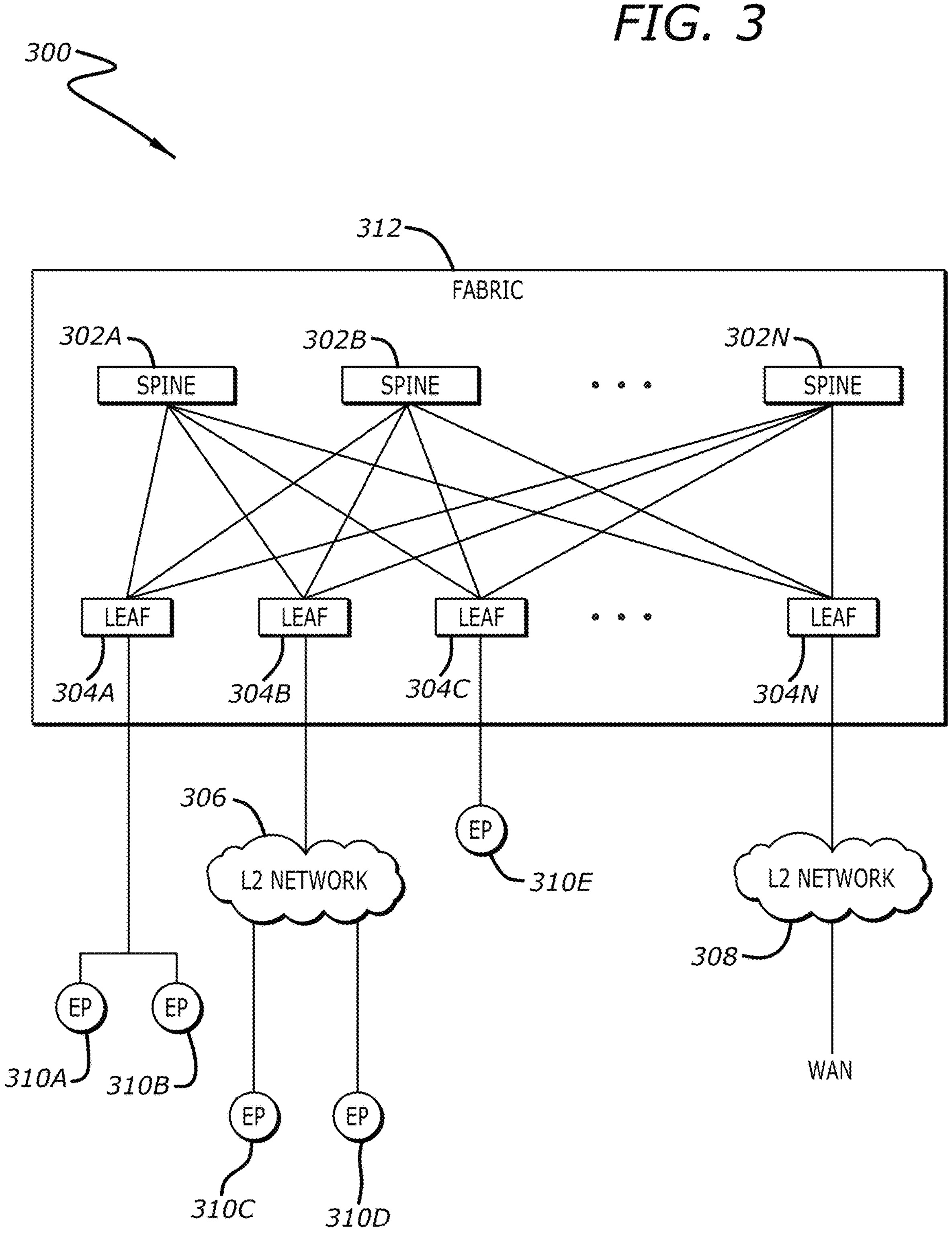
FIG. 3 is a schematic block diagram of an example architecture for a network fabric, in accordance with various embodiments of the disclosure.

Referring now to FIG. 3, a schematic block diagram of an example architecture 300 for a network fabric 312, in accordance with various embodiments of the disclosure is shown. The network fabric 312 can include spine switches $\mathbf{302}_A$, $\mathbf{302}_B$, . . . , $\mathbf{302}_N$ (collectively "302") connected to leaf switches $\mathbf{304}_A$, $\mathbf{304}_B$, $\mathbf{304}_C$ . . . $\mathbf{304}_N$ (collectively "304") in the network fabric 312. As those skilled in the art will recognize, networking fabric can refer to a high-speed, high-bandwidth interconnect system that enables multiple devices to communicate with each other efficiently and reliably. It is a network topology that is designed to provide a flexible and scalable infrastructure for data center, cloud environments, and other network elements.

Various embodiments described herein can include a leaf-spine architecture comprising a plurality of spine switches and leaf switches. Spine switches 302 can be L3 switches in the fabric 312. However, in some cases, the spine switches 302 can also, or otherwise, perform L2 functionalities. Further, the spine switches 302 can support various capabilities, such as, but not limited to, 40 or 10 Gbps Ethernet speeds. To this end, the spine switches 302 can be configured with one or more 40 Gigabit Ethernet ports. In certain embodiments, each port can also be split to support other speeds. For example, a 40 Gigabit Ethernet port can be split into four 10 Gigabit Ethernet ports, although a variety of other combinations are available.

In many embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated tenant packet to get to the destination locator address of the tenant. The spine switches 302 can then perform a lookup of their local mapping database to determine the correct locator address of the packet and forward the packet to the locator address without changing certain fields in the header of the packet.

In various embodiments, when a packet is received at a spine switch $\mathbf{302}_i$, wherein subscript "i" indicates that this operation may occur at any spine switch $\mathbf{302}_A$ to $\mathbf{302}_N$, the spine switch $\mathbf{302}_i$ can first check if the destination locator address is a proxy address. If so, the spine switch $\mathbf{302}_i$ can perform the proxy function as previously mentioned. If not, the spine switch $\mathbf{302}_i$ can look up the locator in its forwarding table and forward the packet accordingly.

In a number of embodiments, one or more spine switches 302 can connect to one or more leaf switches 304 within the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

In more embodiments, leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

In additional embodiments, the leaf switches 304 can be responsible for routing and/or bridging various packets and applying network policies. In some cases, a leaf switch can perform one or more additional functions, such as implementing a mapping cache, sending packets to the proxy function when there is a miss in the cache, encapsulate packets, enforce ingress or egress policies, etc. Moreover, the leaf switches 304 can contain virtual switching functionalities, such as a virtual tunnel endpoint (VTEP) function. To this end, leaf switches 304 can connect the fabric 312 to an overlay network.

In further embodiments, network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect endpoint groups to the fabric 312 and/or any external networks. Each endpoint group can connect to the fabric 312 via one of the leaf switches 304, for example.

Endpoints 310 A-E (collectively "310", shown as "EP") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

In certain embodiments, endpoints 310 can include any communication device, such as a computer, a server, a switch, a router, etc. In some cases, the endpoints 310 can include a server, hypervisor, or switch configured with a VTEP functionality which connects an overlay network, with the fabric 312. The overlay network can host physical devices, such as servers, applications, endpoint groups, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an endpoint group of various applications.

Although a specific embodiment for an architecture 300 is described above with respect to FIG. 3, any of a variety of systems and/or processes may be utilized in accordance with embodiments of the disclosure. For example, the architecture 300 could comprise any variety of endpoints, spine switches, and/or leaf switches. The elements depicted in FIG. 3 may also be interchangeable with other elements of FIGS. 1-2 and 4-7 as required to realize a particularly desired embodiment.

Figure 4:
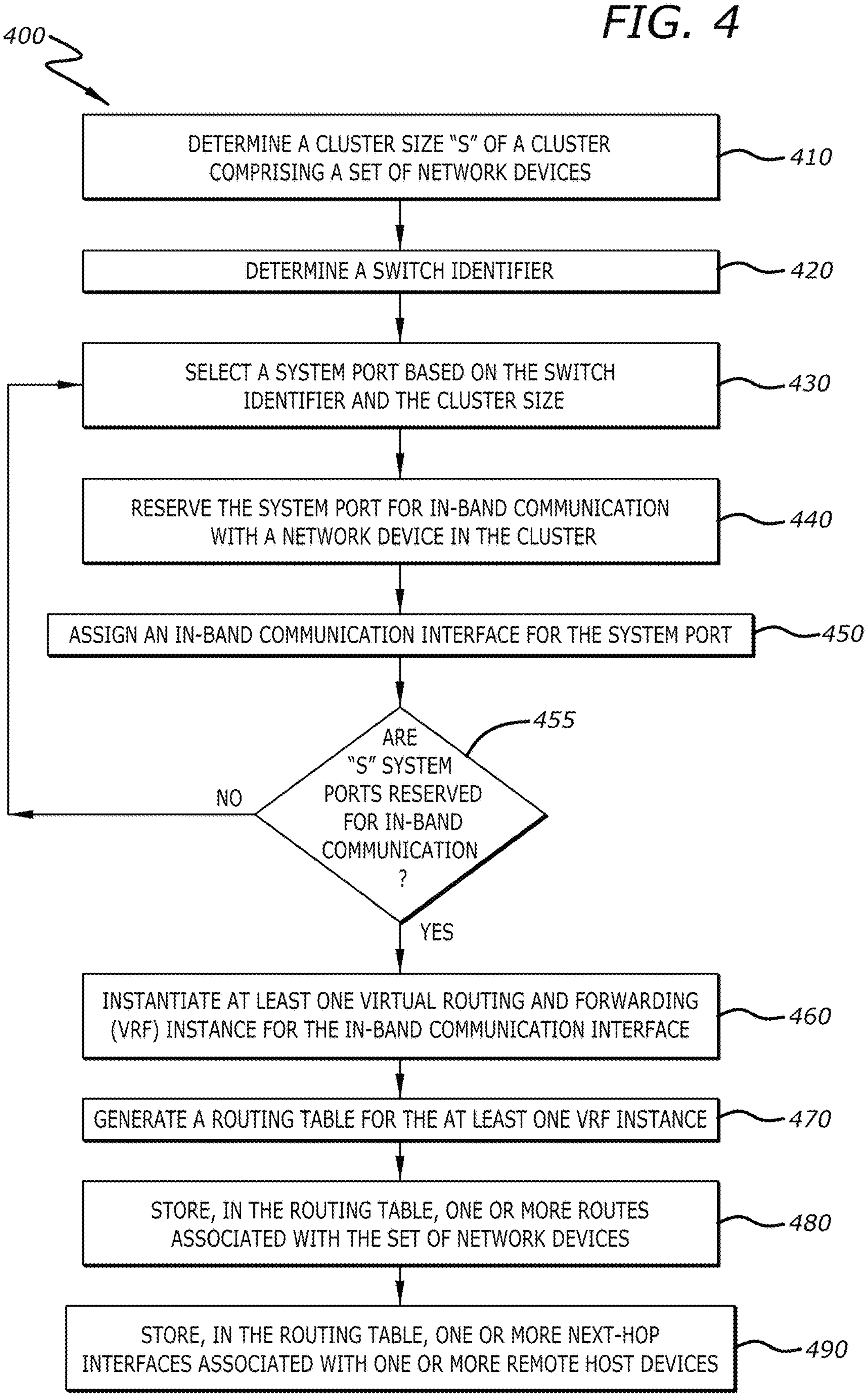
FIG. 4 is a flowchart depicting a process for configuring a set of in-band system ports, in accordance with various embodiments of the disclosure.

Referring now to FIG. 4, a flowchart depicting a process 400 for configuring a set of in-band system ports, in accordance with various embodiments of the disclosure is shown. In many embodiments, the process 400 can determine a cluster size "S" of a cluster comprising a set of network devices (block 410). In some embodiments, the process 400 may be implemented by a leaf switch added to the cluster of network devices in the DSF. In more embodiments, the cluster size can be indicative of a count, i.e., a number of the network devices in the cluster. In certain embodiments, the cluster size may be indicative of a maximum number of network devices in the cluster. In more embodiments, each switch, such as the leaf switches or the spine switches, in the cluster can possess different hardware capabilities. In some more embodiments, for example, the switches may possess different physical parameters, such as but not limited to, a maximum number of nodes that can be supported by the switches, number of ports in the switches, memory or processing capabilities of the switches, protocols implemented by the switches, bandwidth of links connected to the switches, etc. In still more embodiments, the cluster size can be dependent on the hardware capabilities or the physical parameters of the switches in the cluster.

In a number of embodiments, the process 400 can determine the switch identifier (block 420). In some embodiments, the process 400 may determine the switch identifier based on the cluster size associated with the cluster. In certain embodiments, for example, if the switches can support maximum 256 nodes, i.e., for the cluster size of 256, the switch identifiers in the cluster may vary from 0-255. In more embodiments, the switch identifier can facilitate uniquely identifying the leaf switch implementing the process 400 in the cluster. In many more embodiments, for example, the process 400 can determine the switch identifier based on hardware serial numbers, MAC addresses, or user-defined labels etc. In still more embodiments, the process 400 can assign the switch identifier statically at the time of initialization of the switches or dynamically during run time. In many further embodiments, the process 400 can assign the switch identifier based on a combination of the MAC addresses, the hardware serial numbers, or user-defined labels etc.

In various embodiments, the process 400 may select a system port based on the switch identifier and the cluster size (block 430). In some embodiments, the process 400 can select a fabric facing system port connected to a spine switch in the cluster. In certain embodiments, for example, for the cluster including four leaf switches and two spine switches, the switch identifiers for the leaf switches may include Switch-ID-0 through Switch-ID-3, and each leaf switch may include at least two system ports associated with the two spine switches. In more embodiments, for example, the process 400 can utilize one or more load balancing or fault tolerance techniques or may utilize predetermined mapping to select the system ports for the in-band communication, thereby ensuring optimal utilization of the system ports.

In additional embodiments, the process 400 can reserve the system port for the in-band communication with a network device in the cluster (block 440). In some embodiments, the process 400 may allocate the selected system port for the in-band communication. In certain embodiments, the process 400 can utilize the system port reserved for the in-band communication for forwarding the data traffic in the cluster or for management, control, or monitoring functions.

In further embodiments, the process 400 may assign an in-band communication interface for the system port (block 450). In some embodiments, the process 400 can configure the system port to establish in-band communication sessions with one or more network devices in the cluster. In certain embodiments, the in-band communication interface may establish the in-band communication session with a spine switch in the cluster. In more embodiments, the in-band communication session can be established with other leaf switches in the cluster. In some more embodiments, the process 400 may store one or more VOQs for the in-band communication interface.

In many more embodiments, the process 400 can check whether "S" system ports are reserved for the in-band communication session (block 455). In some embodiments, the process 400 can implement a loop that can iterate over each system port of the leaf switch to select the system port and assign the selected system port as the in-band system port. In certain embodiments, the process 400 can iterate the loop by incrementing the switch identifier for each system port until the switch identifier reaches the cluster size "S". In more embodiments, by checking whether "S" system ports are reserved for the in-band communication session, the process 400 can ensure that at least one in-band system port is assigned to the at least one in-band communication interface.

In many additional embodiments, if at block 455 the process 400 determines that "S" system ports are not selected, the process 400 can select the next system port (block 430). In some embodiments, the process 400 can assign one or more system ports for the in-band communication with the network devices in the cluster. In certain embodiments, the loop may select a range of the system ports spanning from 1 to "S". In more embodiments, the process 400 can associate each selected system port with the switch identifiers of one or more of the network devices in the cluster for the in-band communication.

In many further embodiments, if at block 455 the process 400 determines that "S" system ports are selected, the process 400 can instantiate at least one VRF instance for the in-band communication interface (block 460). In some embodiments, the process 400 can ensure by way of the DSF_VRF that the data traffic flowing through the cluster can be segregated or independently managed or routed. In further embodiments, the process 400 can associate the VRF instance with the in-band communication interface.

In still many embodiments, the process 400 may create and store a routing table, a forwarding table, or the static neighbor table etc. associated with the VRF instance (block 470). In some more embodiments, the routing and/or forwarding tables can store the network paths, i.e., the routes for forwarding the data traffic. In numerous embodiments, the static neighbor table can store the custom MAC and IP addresses associated with the network devices in the cluster.

In still further embodiments, the process 400 can store, in the routing table, the routes associated with the set of network devices in the cluster (block 480). In some embodiments, for example, the routing table can store IP prefixes, encapsulation indexes, optimal routes, next hop interfaces, or other reachability data associated with the network devices in the cluster. In more embodiments, for example, the forwarding table may store port information, such as but not limited to MAC addresses, destination port identifiers or destination port numbers, frame types, or next hop interfaces etc. In some more embodiments, the routing and/or forwarding tables can also store dynamic status data indicative of operational statuses of the network devices and/or fabric links in the cluster. In numerous embodiments, for example, the dynamic status data may be indicative of whether the network devices and/or the fabric links are operational, not operational, or failed etc.

In numerous embodiments, the process 400 may store, in the routing table, one or more next hop interfaces associated with one or more remote host devices (block 490). In some embodiments, the routing and/or forwarding tables can store destination IP or MAC addresses of the host devices and corresponding next hop interfaces such as port numbers or switch identifiers associated with the host devices. In certain embodiments, the next hop interfaces may be indicative of egress points or gateways through which the data traffic destined for the host devices should be forwarded.

Although a specific embodiment for the process 400 for configuring the set of in-band system ports for carrying out the various steps, processes, methods, and operations described herein is discussed with respect to FIG. 4, any of a variety of systems and/or processes may be utilized in accordance with embodiments of the disclosure. For example, the process 400 may create the in-band communication network in the DSF. The elements depicted in FIG. 4 may also be interchangeable with other elements of FIGS. 1-3 and FIGS. 5-7 as required to realize a particularly desired embodiment.

Figure 5:
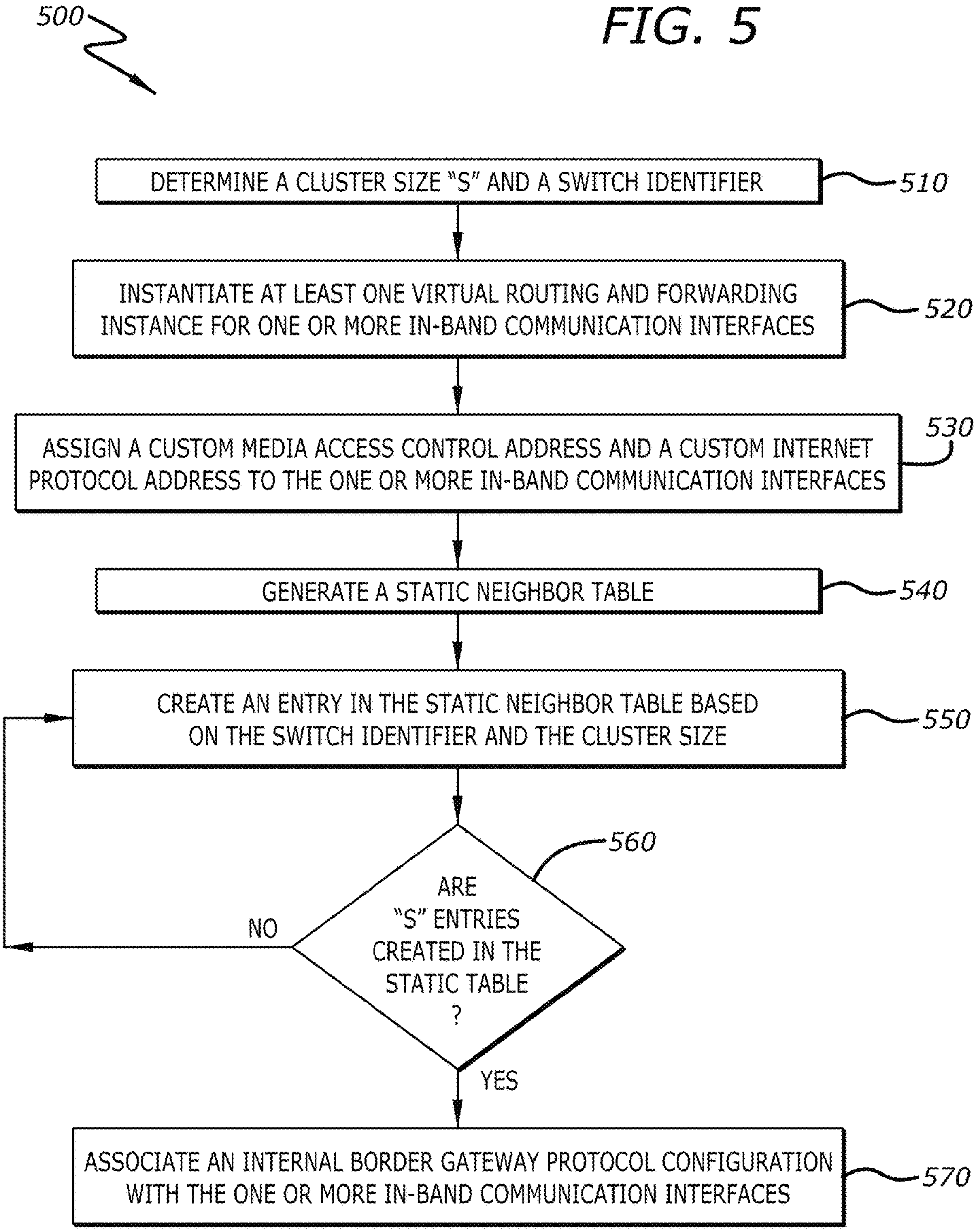
FIG. 5 is a flowchart depicting a process for generating a custom Media Access Control (MAC) address and a custom Internet Protocol (IP) address, in accordance with various embodiments of the disclosure.

Referring now to FIG. 5, a flowchart depicting a process 500 for generating the custom MAC and IP addresses, in accordance with various embodiments of the disclosure is shown. In many embodiments, the process 500 can determine the cluster size "S" and the switch identifier (block 510). In some embodiments, the process 500 may be implemented by the leaf switch added to the cluster of network devices in the DSF. In certain embodiments, the leaf switch can be associated with a unique switch identifier within the cluster.

In a number of embodiments, the process 500 may instantiate the VRF instance for one or more in-band communication interfaces (block 520). In some embodiments, the VRF instance can be associated with one or more in-band system ports. In certain embodiments, the process 500 can store the routing and/or forwarding tables associated with the VRF instance in a memory.

In additional embodiments, the process 500 can assign the custom MAC address and the custom IP address to the leaf switch (block 530). In some embodiments, the process 500 may generate the custom MAC and IP addresses based on the switch identifier associated with the leaf switch. In certain embodiments, the custom MAC and IP addresses can include the switch identifier or can be a combination of the switch identifier and a serial number associated with the leaf switch. In more embodiments, the custom IP address can include a subnet IP address associated with the leaf switch. In some more embodiments, the custom IP address can include a Classless Inter-Domain Routing (CIDR) block comprising a prefix and a suffix indicative of a network address and a host address.

In further embodiments, the process 500 may generate the static neighbor table (block 540). In some embodiments, the static neighbor table can be generated at the time of initialization of the leaf switch or at the time of onboarding the leaf switch in the cluster. In certain embodiments, the static neighbor table can include pairings of IP and MAC addresses.

In many more embodiments, the process 500 can create an entry in the static neighbor table based on the switch identifier and the cluster size (block 550). In some embodiments, the process 500 can select the switch identifier of one of the switches in the cluster. In certain embodiments, the process 500 may determine the custom MAC address and/or the custom IP address associated with the selected switch identifier. In more embodiments, the process 500 can create an entry in the static neighbor table to store the determined custom MAC address and/or the custom IP address. In some more embodiments, for example, the process 500 can store the next hop interfaces associated with the determined custom MAC address and/or the custom IP address in the static neighbor table.

In many additional embodiments, the process 500 may check whether there are "S" entries in the static table (block 560). In some embodiments, the process 500 can ensure that the static neighbor table includes at least one entry for each network device in the cluster. In certain embodiments, the process 500 can implement a loop that iterates over each switch identifier in the cluster to populate the static neighbor table with the MAC addresses and/or IP addresses associated with the selected switch identifier.

In many more embodiments, if at block 560 the process 500 determines that "S" entries are not created in the static neighbor table, the process 500 can create the next entry in the static neighbor table (block 550). In some embodiments, the process 500 may select the next switch identifier by incrementing previous switch identifier. In certain embodiments, the process 500 can iterate the loop by incrementing the switch identifier for each switch until the switch identifier reaches the cluster size "S".

In many additional embodiments, if at block 560 the process 500 determines that "S" entries are created in the static neighbor table, the process 500 can associate an iBGP configuration with the one or more in-band communication interfaces (block 570). In some embodiments, the process 500 can enable exchanging routing information and managing the data traffic in the cluster. In certain embodiments, the process 500 may advertise the custom MAC address and/or the custom IP address by way of the iBGP sessions.

Although a specific embodiment for the process 500 for generating the custom MAC and IP addresses for carrying out the various steps, processes, methods, and operations described herein is discussed with respect to FIG. 5, any of a variety of systems and/or processes may be utilized in accordance with embodiments of the disclosure. For example, the generation and assignment of the custom MAC and IP addresses can be automated to facilitate easy scalability of the DSF. The elements depicted in FIG. 5 may also be interchangeable with other elements of FIGS. 1-4 and FIGS. 6-7 as required to realize a particularly desired embodiment.

Figure 6:
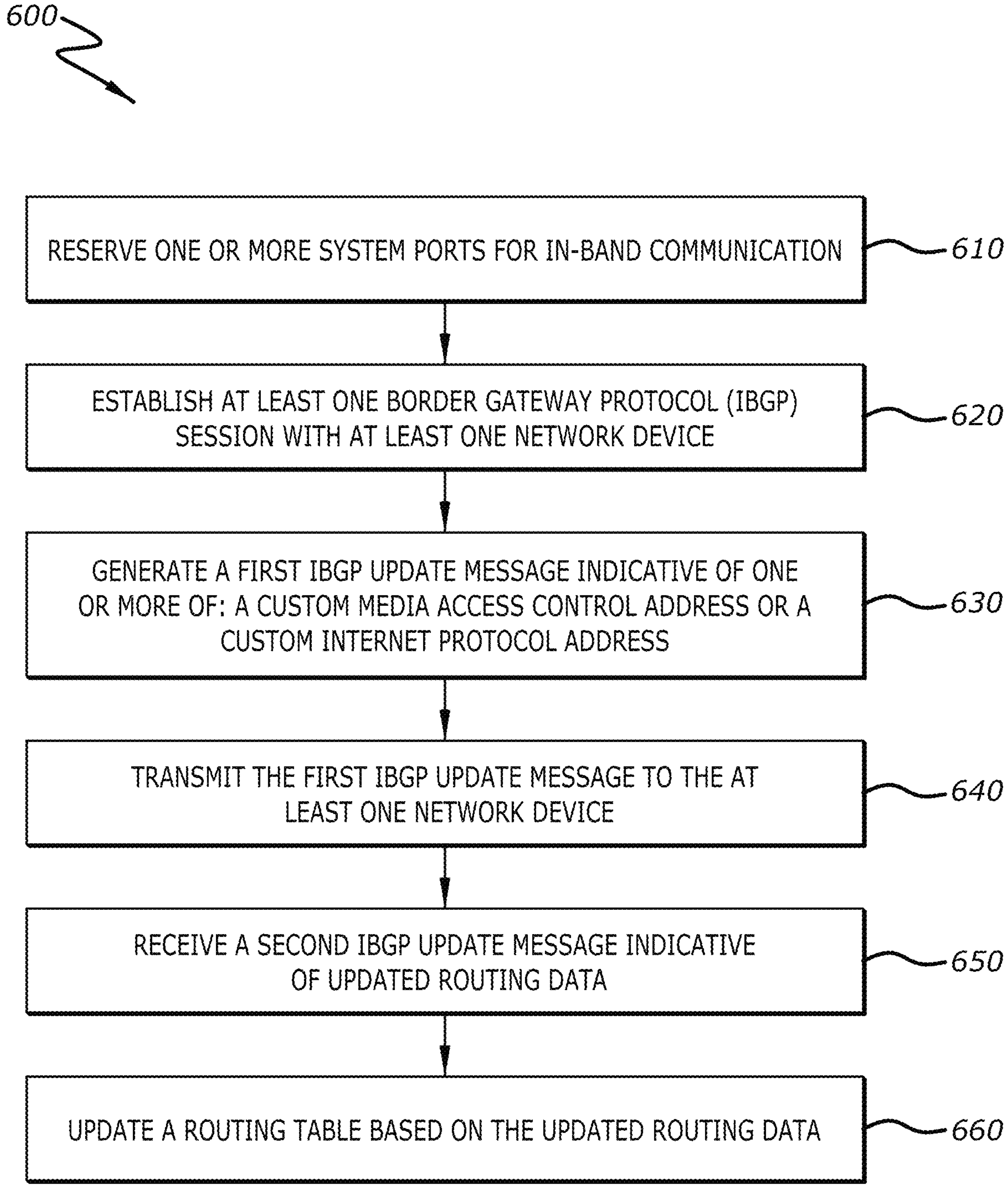
FIG. 6 is a flowchart depicting a process for an internal Border Gateway Protocol (iBGP) configuration, in accordance with various embodiments of the disclosure.

Referring now to FIG. 6, a flowchart depicting a process 600 for the iBGP configuration, in accordance with various embodiments of the disclosure is shown. In many embodiments, the process 600 can reserve the one or more system ports for the in-band communication (block 610). In some embodiments, the one or more system ports can be fabric facing system ports connected to the spine switches in the cluster. In certain embodiments, the process 600 can be implemented by the leaf switch in the cluster.

In a number of embodiments, the process 600 may establish at least one iBGP session with at least one network device (block 620). In some embodiments, the process 600 may utilize one or more address families such as but not limited to the IPV4 address family, IPv6 address family, or EVPN address family etc. to establish the iBGP sessions. In certain embodiments, the network devices in the cluster may be connected in a mesh topology.

In various embodiments, the process 600 can generate the first iBGP update message indicative of one or more of: the custom MAC address or the custom IP address (block 630). In some embodiments, the first iBGP update message can be the EVPN Type 2 message. In certain embodiments, the process 600 may generate the first iBGP update message at the time of initialization or association with the cluster. In more embodiments, the process 600 can generate the first iBGP update message periodically or dynamically based on changes in topology of the DSF.

In additional embodiments, the process 600 may transmit the first iBGP update message to at least one network device in the cluster (block 640). In some embodiments, the network devices, such as the leaf switches in the cluster can receive the first iBGP update message and can update the routing and/or forwarding tables based on the first iBGP update message. In certain embodiments, the process 600 can transmit reachability information to the network devices in the cluster by way of the first iBGP update message.

In further embodiments, the process 600 can receive the second iBGP update message indicative of the updated routing data (block 650). In some embodiments, the second iBGP update message can be indicative of the MAC and IP addresses of the leaf switches in the cluster. In certain embodiments, the second iBGP update message may be indicative of the reachability data associated with the leaf switches in the cluster.

In any more embodiments, the process 600 may update the routing and/or forwarding table based on the second iBGP update message (block 660). In some embodiments, the second iBGP update message can be indicative of advertisement of new network paths or routes or withdrawal of previously advertised routes. In certain embodiments, the second iBGP update message may be indicative of the updated routing data including changes to the routes, next hop interfaces, or other routing attributes etc. for example.

Although a specific embodiment for the process 600 for the iBGP configuration for carrying out the various steps, processes, methods, and operations described herein is discussed with respect to FIG. 6, any of a variety of systems and/or processes may be utilized in accordance with embodiments of the disclosure. For example, the process 600 can transmit and/or receive the updated routing data and updated reachability data by utilizing iBGP. The elements depicted in FIG. 6 may also be interchangeable with other elements of FIGS. 1-5 and FIG. 7 as required to realize a particularly desired embodiment.

Figure 7:
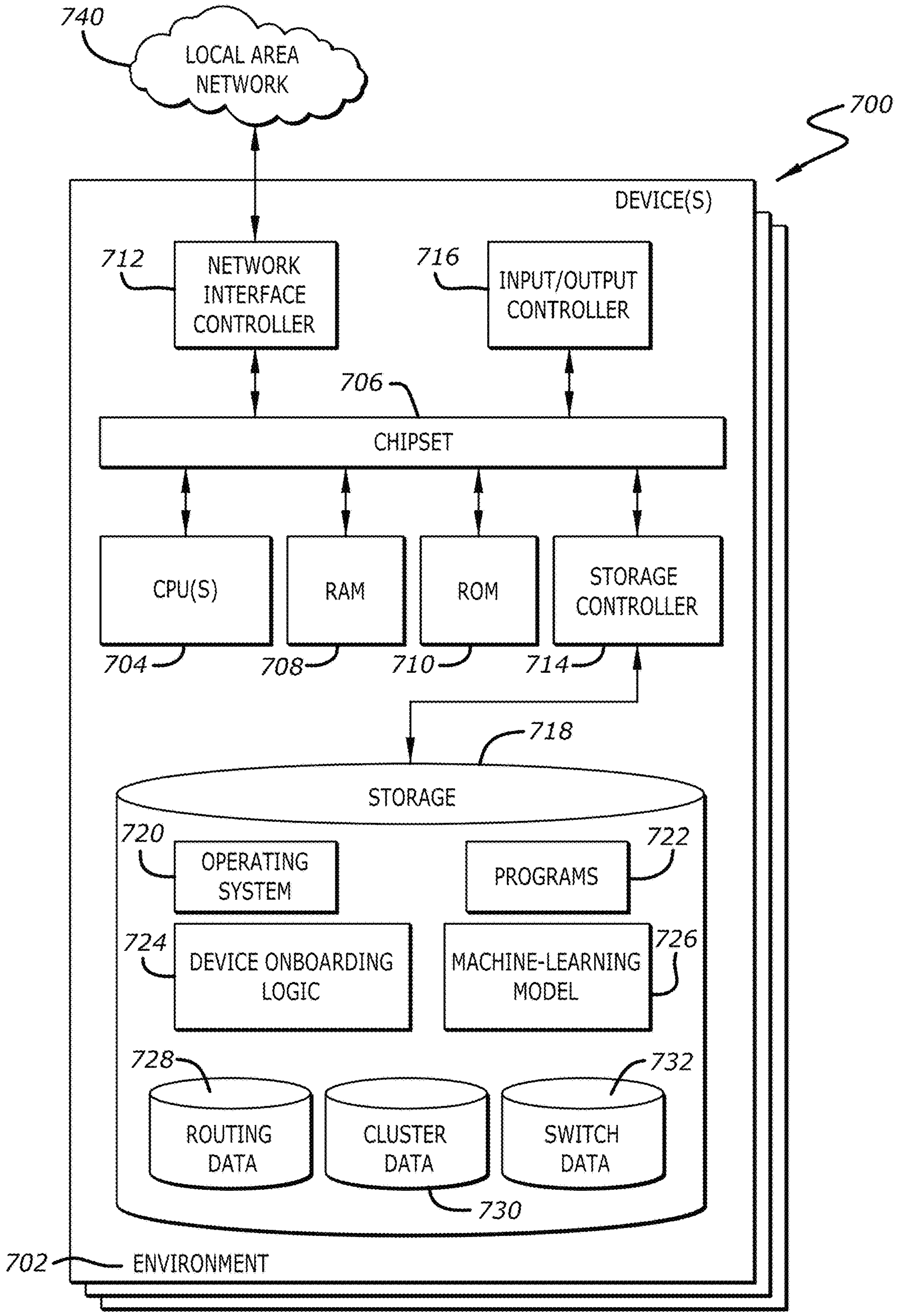
FIG. 7 is a conceptual block diagram of a device suitable for configuration with a device onboarding logic, in accordance with various embodiments of the disclosure.

Referring to FIG. 7, a conceptual block diagram of a device 700 suitable for configuration with a device onboarding logic, in accordance with various embodiments of the disclosure is shown. The embodiment of the conceptual block diagram depicted in FIG. 7 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 7 can also illustrate an access point, a switch, or a router in accordance with various embodiments of the disclosure. The device 700 may, in many non-limiting examples, correspond to physical devices or to virtual resources described herein.

In many embodiments, the device 700 may include an environment 702 such as a baseboard or "motherboard," in physical embodiments that can be configured as a printed circuit board with a multitude of components or devices connected by way of a system bus or other electrical communication paths. Conceptually, in virtualized embodiments, the environment 702 may be a virtual environment that encompasses and executes the remaining components and resources of the device 700. In more embodiments, one or more processors 704, such as, but not limited to, central processing units ("CPUs") can be configured to operate in conjunction with a chipset 706. The processor(s) 704 can be standard programmable CPUs that perform arithmetic and logical operations necessary for the operation of the device 700.

In a number of embodiments, the processor(s) 704 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 706 may provide an interface between the processor(s) 704 and the remainder of the components and devices within the environment 702. The chipset 706 can provide an interface to a random-access memory ("RAM") 708, which can be used as the main memory in the device 700 in some embodiments. The chipset 706 can further be configured to provide an interface to a computer-readable storage medium such as a read-only memory ("ROM") 710 or non-volatile RAM ("NVRAM") for storing basic routines that can help with various tasks such as, but not limited to, starting up the device 700 and/or transferring information between the various components and devices. The ROM 710 or NVRAM can also store other application components necessary for the operation of the device 700 in accordance with various embodiments described herein.

Additional embodiments of the device 700 can be configured to operate in a networked environment using logical connections to remote computing devices and computer systems through a network, such as the network 740. The chipset 706 can include functionality for providing network connectivity through a network interface card ("NIC") 712, which may comprise a gigabit Ethernet adapter or similar component. The NIC 712 can be capable of connecting the device 700 to other devices over the network 740. It is contemplated that multiple NICs 712 may be present in the device 700, connecting the device to other types of networks and remote systems.

In further embodiments, the device 700 can be connected to a storage 718 that provides non-volatile storage for data accessible by the device 700. The storage 718 can, for instance, store an operating system 720, applications 722, routing data 728, cluster data 730, and switch data 732 which are described in greater detail below. The storage 718 can be connected to the environment 702 through a storage controller 714 connected to the chipset 706. In certain embodiments, the storage 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The routing data 728 can store the routing and/or forwarding tables, the custom MAC and IP addresses, the switch identifier of the device 700, the iBGP update messages, the reachability data, and/or the static neighbor table etc. The cluster data 730 may store the cluster size, and/or switch identifiers of the network devices in the cluster etc. The switch data 732 can store the switch identifiers, system port identifiers, and/or VRF data etc.

The device 700 can store data within the storage 718 by transforming the physical state of the physical storage units to reflect the information being stored. The specific transformation of physical state can depend on various factors. Examples of such factors can include, but are not limited to, the technology used to implement the physical storage units, whether the storage 718 is characterized as primary or secondary storage, and the like.

In many more embodiments, the device 700 can store information within the storage 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 700 can further read or access information from the storage 718 by detecting the physical states or characteristics of one or more particular locations within the physical storage units.

In addition to the storage 718 described above, the device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 700. In some examples, the operations performed by a cloud computing network, and or any components included therein, may be supported by one or more devices similar to device 700. Stated otherwise, some or all of the operations performed by the cloud computing network, and or any components included therein, may be performed by one or more devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 718 can store an operating system 720 utilized to control the operation of the device 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 718 can store other system or application programs and data utilized by the device 700.

In many additional embodiments, the storage 718 or other computer-readable storage media is encoded with computer-executable instructions which, when loaded into the device 700, may transform it from a general-purpose computing system into a special-purpose computer capable of implementing the embodiments described herein. These computer-executable instructions may be stored as application 722 and transform the device 700 by specifying how the processor(s) 704 can transition between states, as described above. In some embodiments, the device 700 has access to computer-readable storage media storing computer-executable instructions which, when executed by the device 700, perform the various processes described above with regard to FIGS. 1-6. In certain embodiments, the device 700 can also include computer-readable storage media having instructions stored thereupon for performing any of the other computer-implemented operations described herein.

In many further embodiments, the device 700 may include a device onboarding logic 724. The device onboarding logic 724 can be configured to perform one or more of the various steps, processes, operations, and/or other methods that are described above. Often, the device onboarding logic 724 can be a set of instructions stored within a non-volatile memory that, when executed by the processor(s)/controller(s) 704 can carry out these steps, etc. In some embodiments, the device onboarding logic 724 may be a client application that resides on a network-connected device, such as, but not limited to, a server, switch, personal or mobile computing device in a single or distributed arrangement. The device onboarding logic 724 may generate the switch identifier, the custom MAC address, and/or the custom IP address. The device onboarding logic 724 can also assign the in-band system ports to in-band communication interfaces. The device onboarding logic 724 may establish the in-band communication sessions with the network devices in the cluster and exchange the updated routing data with the network devices in the cluster. The device onboarding logic 724 can also store and update the routing and/or forwarding tables and the static neighbor table.

In still further embodiments, the device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can be configured to provide output to a display, such as a computer monitor, a flat panel display, a digital projector, a printer, or other type of output device. Those skilled in the art will recognize that the device 700 might not include all of the components shown in FIG. 7 and can include other components that are not explicitly shown in FIG. 7 or might utilize an architecture completely different than that shown in FIG. 7.

As described above, the device 700 may support a virtualization layer, such as one or more virtual resources executing on the device 700. In some examples, the virtualization layer may be supported by a hypervisor that provides one or more virtual machines running on the device 700 to perform functions described herein. The virtualization layer may generally support a virtual resource that performs at least a portion of the techniques described herein.

Finally, in numerous additional embodiments, data may be processed into a format usable by a machine-learning model 726 (e.g., feature vectors), and or other pre-processing techniques. The machine-learning ("ML") model 726 may be any type of ML model, such as supervised models, reinforcement models, and/or unsupervised models. The ML model 726 may include one or more of linear regression models, logistic regression models, decision trees, Naïve Bayes models, neural networks, k-means cluster models, random forest models, and/or other types of ML models 726.

The ML model(s) 726 can be configured to generate inferences to make predictions or draw conclusions from data. An inference can be considered the output of a process of applying a model to new data. This can occur by learning from at least the routing data 728, the cluster data 730, and the switch data 732 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 726 may be generated by human/administrator verifications or may compare predicted outcomes with actual outcomes.

Although a specific embodiment for the device 700 suitable for configuration with the device onboarding logic for carrying out the various steps, processes, methods, and operations described herein is discussed with respect to FIG. 7, any of a variety of systems and/or processes may be utilized in accordance with embodiments of the disclosure. For example, the device 700 may be in a virtual environment such as a cloud-based network administration suite, or it may be distributed across a variety of network devices or switches. The elements depicted in FIG. 7 may also be interchangeable with other elements of FIGS. 1-6 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor; and
a memory communicatively coupled to the processor, wherein the memory comprises a
device onboarding logic that is configured to:
detect a set of network devices in a cluster;
determine a cluster size associated with the cluster;
generate a switch identifier based on the cluster size;
select one or more system ports based at least on the switch identifier and the cluster size; and
assign at least one in-band communication interface to the one or more system ports.

2. The device of claim 1, wherein the device onboarding logic is further configured to instantiate at least one Virtual Routing and Forwarding (VRF) instance for the at least one in-band communication interface.

3. The device of claim 2, wherein the device onboarding logic is further configured to generate, based on the switch identifier, at least one of: a custom Media Access Control (MAC) address or a custom Internet Protocol (IP) address.

4. The device of claim 3, wherein the device onboarding logic is further configured to determine one or more routes associated with at least one network device of the set of network devices.

5. The device of claim 4, wherein the device onboarding logic is further configured to generate, for the at least one VRF instance, a routing table comprising the one or more routes.

6. The device of claim 5, wherein the device onboarding logic is further configured to:
detect at least one remote host device;
determine one or more next hop interfaces associated with the at least one remote host device; and
store the one or more next hop interfaces in the routing table.

7. The device of claim 6, wherein the device onboarding logic is further configured to establish, through the at least one in-band communication interface, one or more in-band communication sessions with the set of network devices.

8. The device of claim 7, wherein the one or more in-band communication sessions are established based on internal Border Gateway Protocol (iBGP).

9. The device of claim 8, wherein the device onboarding logic is further configured to:
generate a first iBGP update message indicative of one or more of: the custom MAC address or the custom IP address; and
transmit the first iBGP update message to the set of network devices.

10. The device of claim 9, wherein the device onboarding logic is further configured to:
receive a second iBGP update message indicative of one or more updated routes; and
update the routing table based on the one or more updated routes.

11. The device of claim 10, wherein the device onboarding logic is further configured to create one or more Virtual Output Queues (VOQs) for the at least one in-band communication interface.

12. The device of claim 11, wherein the device onboarding logic is further configured to:
determine one or more physical parameters of the set of network devices; and
determine the cluster size based on the one or more physical parameters.

13. The device of claim 12, wherein the cluster size is indicative of a maximum count of the set of network devices in the cluster.

14. A method, comprising:

creating a cluster comprising a set of network devices;

determining a cluster size associated with the cluster;

detecting a network device;

assigning a switch identifier to the network device based on the cluster size;

adding the network device to the cluster;

selecting, based at least on the switch identifier and the cluster size, one or more system ports of the network device; and configuring at least one in-band communication interface for the one or more system ports.

15. The method of claim 14, wherein the method further comprises instantiating at least one Virtual Routing and Forwarding (VRF) instance for the at least one in-band communication interface.

16. The method of claim 15, wherein the method further comprises assigning to the network device, based on the switch identifier, at least one of: a custom Media Access Control (MAC) address or a custom Internet Protocol (IP) address.

17. The method of claim 16, wherein the method further comprises establishing one or more in-band communication sessions between the network device and the set of network devices through the at least one in-band communication interface based at least on the custom MAC address or the custom IP address.

* * * * *